United States Patent

Young et al.

[11] Patent Number: 5,971,186
[45] Date of Patent: Oct. 26, 1999

[54] SELF-ADJUSTING RING-RISER AND CONDUIT BOX

[76] Inventors: Mark Wah Sun Young, P.O. Box 994, SLC, Utah 84110; Keith Wah Sen Young, 3017 Kavnaoa St., Honolulu, Hi. 96815

[21] Appl. No.: 08/924,696

[22] Filed: Sep. 9, 1997

Related U.S. Application Data

[63] Continuation-in-part of application No. 08/725,152, Oct. 3, 1996, abandoned.

[51] Int. Cl.$^6$ ........................................................ H02G 3/00
[52] U.S. Cl. ........................................... 220/3.7; 220/3.8
[58] Field of Search .............................. 220/3.7, 3.2, 3.8, 220/3.94, 3.3

[56] References Cited

U.S. PATENT DOCUMENTS

| | | | |
|---|---|---|---|
| 1,672,683 | 6/1928 | Knoderer | 220/3.7 X |
| 2,044,860 | 6/1936 | Silverman | 220/3.7 |
| 3,036,207 | 5/1962 | Endelson | 220/3.7 X |
| 3,099,404 | 7/1963 | Kaufman et al. | 220/3.7 X |
| 3,113,694 | 12/1963 | Sulzer | 220/3.8 X |
| 3,917,899 | 11/1975 | Oliver | 220/3.7 X |
| 4,098,423 | 7/1978 | Marrem | . |
| 4,634,015 | 1/1987 | Taylor | . |
| 4,757,908 | 7/1988 | Medlin | 220/3.7 X |
| 5,289,934 | 3/1994 | Smith et al. | . |

FOREIGN PATENT DOCUMENTS

| | | | |
|---|---|---|---|
| 206963 | 6/1959 | Germany | 220/3.7 |

*Primary Examiner*—Steven Pollard

[57] ABSTRACT

A ring-riser or conduit box or bracket for use in building electrical systems, telephone wiring, cable systems and similar applications including a device or fixture. The ring-riser or box or bracket has arcuate slots to receive self-tapping screws allowing the device or fixture to be aligned about its axis. The device or fixture can be fastened to the ring-riser or box or bracket with self-tapping screws through the slots.

12 Claims, No Drawings

SELF-ADJUSTING RING-RISER AND CONDUIT BOX

This application is a continuation in part of U.S. patent application Ser. No. 08/725,152, filed Oct. 3, 1996, now abandoned.

BACKGROUND

1. Cross-References to Related Applications

Ring-risers and Conduit Boxes for electrical and other wires. This invention uses the Disclosure Document No. 363139 received by the PTO on Oct. 11, 1994.

2. Field of Invention

Conventional ring-risers and conduit boxes which have threaded screw holes for mounting

| | |
|---|---|
| "Outlet or Junction Box" | 1,672,683 Knoderer 6/5/28 |
| "Electrical Wall Cabinet" | 2,044,860 Silverman 6/23/36 |
| "Lighting Fixture" | 3,036,207 Endelson 5/22/62 |
| "Recessed Lighting Fixtures" | 3,099,404 Kaufman, et al. 7/30/63 |
| "Plate For Adjustably Mounting Electrical Receptacle" | 3,917,899 Oliver 11/4/75 |
| "Self-Aligning Outlet Box Assembly" | 4,098,423 Marrero 5/22/90 |
| "Adjustable Electric Outlet Box" | 4,634,015 Taylor 1/6/87 |
| "Dual Size Outlet Box Mounting Bracket " | 4,757,908 Medlin, Sr. 7/19/88 |
| "Adjustable Mounting Assembly for Electrical Outlet Box" | 5,289,934 Smith et al. 3/1/94 |
| "Unterputzdose mit eingesetzter Tragvorrichtung for mehrere Installationsgerate" | 206963 Germany 1/11/60 |

3. Discussion of Prior Art

Conventional ring-risers and conduit boxes which have threaded screw holes for mounting.

The conventional ring-risers and conduit boxes do not allow the fixture to be aligned vertically if the box assembly is mounted slanted. The misaligned box assembly can be a serious problem to correct when the box assembly is mounted misaligned in a hardened concrete wall. The misaligned box assembly has to be loosened from its original position by chipping the box out of the wall. Then a new box assembly must be installed properly aligned. Our improved conduit box will solve this problem because can be the device or fixture can be mounted vertically even if our box is misaligned.

The current procedures for installation of conduit boxes with ring-risers is an electrician will prefabricate an electrical box. The prefabrication includes punching out the mechanically stamped knock-out holes in the box. Conduit pipe is then connected to the box via conduit connectors through the punched out knock-out holes. The electrician then tapes the outside of the box assembly with masking or duct tape to prevent concrete from entering the box assembly. The electrician usually follows the steel-worker who puts in the rebar for the concrete wall. The electrician installs the electrical conduit and the box assembly at the same time. The electrician then attaches the ring-riser to the box assembly. The electrician then seals the outside of the box with masking or duct tape. The tape prevents the concrete and concrete slurry from entering the box. The electrician then fills the box assembly with newspaper to provide additional protection from concrete and concrete slurry from entering the box assembly. The electrician then seals the front of the ring-riser with tape.

The electrician then secures the box assembly with wire to rebar, conduit or anything except water pipes in the to be formed wall. This securing is to prevent the box assembly from shifting during the placement of the concrete in the wall forms or the consolidation of the placed concrete to remove voids in the concrete. The mason then places the concrete in the form to create the concrete wall. The concrete is very heavy and the pressure from the weight of the concrete and the vibration for consolidation of the concrete to remove voids often cause the box to shift. The concrete then cures. A misaligned box is then in situ in hardened concrete. The device or fixture to be mounted cannot be mounted vertically in a misaligned box.

To fix the problem the misaligned box must then be chipped out of the concrete wall and thrown away. A new electrical box and a new ring-riser must then be installed. An opening capable of receiving the new box aligned properly must be chipped out of the concrete wall before mounting the new box. The process of removing the old box from the concrete wall is time consuming and labor intensive. Furthermore, the strength of the concrete wall is decreased by the disturbance of chipping the old box out of the wall. Applicants' improved ring-riser and conduit box will solve this problem. Applicants' box can be mounted misaligned in a concrete wall and allow the device or fixture to be mounted vertically without removing and replacing the box assembly.

Furthermore, applicants improved ring-riser does not require additional special parts to mount the device or fixture vertically. Applicants' improved ring-riser is a very simple design.

| | |
|---|---|
| "Outlet or Junction Box" | 1,672,683 Knoderer 6/5/28 |

Knoderer shows a cover plate with arcuate slots used to secure a switch or fixture "by clamping screws 15 threaded therein" (e.g. p. 2, 1. 4–5).

The structure of Knoderer is such that to mount a fixture are as follows: First, the crown flange 13 must be adjusted utilizing the threaded screws 15 and tightened. Second, the fixture must be mounted through ears 14. Third, the cover 5' is snapped to the junction box 1. In comparison, applicants' ring-riser has a two step installation process. First, the ring-riser is fastened to a conventional junction box. Second, the electrical device is fastened to the ring-riser with a self-tapping screw (aligned itself in the process of installing). Applicants' installation process has one less step. Furthermore the order of mounting the cover (ring-riser) is reversed.

Knoderer FIG. 1 further shows that threaded screws were the intent of Knoderer because the arcuate slots have a circular hole at the end for the head of the threaded screw to go through the plate.

In addition, Knoderer utilizes threaded screws. In comparison, the applicants' improved ring-riser utilizes self-tapping screws which only require the slot as a 'pilot hole' for the screw to get started. The slot acts as an integral part of the self tapping screw.

Furthermore, Knoderer states, "This invention has for its object the provision of an improved junction or outlet box having simple connection means between the cover and body portions whereby they go together with a snap action; whereby all loose parts or parts requiring to be separately operated are dispensed with." (e.g. p. 1, 1. 25–31). This clearly demonstrates that Knoderer intended to have a snap in unit without loose parts. In comparison, applicants' improved ring-riser has no loose parts such as the fixture which is not secured until the self-tapping screws are attached to the ring-riser.

In addition, Knoderer's comment to dispense with loose parts demonstrates that Knoderer intended to use threaded screws and did not intend to utilize self-tapping screws which are loose until screwed in place.

Knoderer contemplates having a self contained attachment mechanism. Considering the time frame that the Knoderer application was filed in 1921 when materials were a much more expensive portion of construction than labor, the intent of the patent should be interpreted that Knoderer wished to limit the number of loose parts which could be lost and were difficult to replace. Knoderer had a lesser concern with the amount of time labor was needed to install the junction box. In comparison, the applicant's improved ring-riser takes into account the modem high cost of labor. Once the ring-riser is mounted, an electrician would use a screw gun and mount the electrical fixture in little time as opposed to the three step procedure described in paragraph above. Furthermore, screws and electrical fixtures are much available now than in 1921, an unforeseen event. Therefore, applicants' ring-riser has an unexpected benefit of saving labor time.

Furthermore, Knoderer contemplates utilizing a customized junction box as well as a custom cover plate to utilize the snap interface between the plate and the box. In comparison, the applicants' ring-riser would utilize a conventional junction box, thus reducing the costs by not requiring a custom made box. Therefore, applicants' ring-riser has an unexpected benefit of cost savings.

Knoderer utilizes a threaded screw which penetrates an arcuate slot and is received by a screw threaded hole. These patents utilize three elements for its fastening means: 1) threaded screw, 2) arcuate slot, and 3) screw threaded socket. The threaded screw penetrates the arcuate slot and threads into the screw threaded socket. The fastening occurs through a clamping means gripping the arcuate slot between the threaded screw and the screw threaded socket. In comparison, applicants' self-tapping fastening means only has two elements: 1) self-tapping screw and 2) arcuate slot. The self-tapping screw engages with the arcuate slot to form the fastening means. Thus applicants' conduit box's fastening means omits an element.

Knoderer utilizes a threaded screw which penetrates an arcuate slot and is received by a screw threaded hole. Applicants' conduit box fastening means utilizes a self-tapping screw which does not require a screw threaded hole. Thus the applicants' have made an unsuggested modification.

Knoderer utilizes a threaded screw which penetrates an arcuate slot and is received by a screw threaded hole. Threaded screws must be carefully screwed in to prevent the screw threading from being "stripped." The preferred method of screwing such small threaded screws is to use a manual screwdriver. This is time consuming. In comparison, applicants' conduit box utilizes a self-tapping screw which can be screwed in with a screw-gun which is much faster than a manual screwdriver. Since the screw is self-tapping and does not require close tolerance threading, the installer is less concerned with stripping the threads on the screw. The applicants' conduit box utilizes a new principle of operation by utilizing self-tapping screws.

| "Electrical Wall Cabinet" | 2,044,860 Silverman 6/23/36 |
| --- | --- |

Silverman shows an electrical wall cabinet with arcuate slots that are used to insure "an accurate relation between the electrical devices, the shield and the front of the cabinet notwithstanding any adjustment that is made." (e.g. c. 1, 1. 54–55 and c. 2, 1. 1). FIG. 3 clearly shows the use of a threaded screw 30 and the "screw-threaded sockets 28." (e.g. col. 4, 1. 11). Therefore, the screws for the arcuate slots are threaded.

In comparison, the applicants' improved conduit box utilizes self-tapping screws. Therefore, the arcuate slot is an integral part of the fastening of the electrical receptacle to the ring-riser. Whereas, Silverman utilizes the arcuate slots merely as a guide for the screw and are not integral part of the fastening means.

Furthermore, Silverman's application of a wall cabinet electrical box is likely to have a number of loose wires contained in the box. The utilization of self-tapping screws in such an application may 'pinch' or damage some of the interior wires because of the number of wires and the restricted space. Therefore, the use of self-tapping screws is unobvious in Silverman.

Silverman utilizes a threaded screw which penetrates an arcuate slot and is received by a screw threaded hole. These patents utilize three elements for its fastening means: 1) threaded screw, 2) arcuate slot, and 3) screw threaded socket. The threaded screw penetrates the arcuate slot and threads into the screw threaded socket. The fastening occurs through a clamping means gripping the arcuate slot between the threaded screw and the screw threaded socket. In comparison, applicants' self-tapping fastening means only has two elements: 1) self-tapping screw and 2) arcuate slot. The self-tapping screw engages with the arcuate slot to form the fastening means. Thus applicants' conduit box's fastening means omits an element.

Silverman utilizes a threaded screw which penetrates an arcuate slot and is received by a screw threaded hole. Applicants' conduit box fastening means utilizes a self-tapping screw which does not require a screw threaded hole. Thus the applicants' have made an unsuggested modification.

Silverman utilizes a threaded screw which penetrates an arcuate slot and is received by a screw threaded hole. Threaded screws must be carefully screwed in to prevent the screw threading from being "stripped." The preferred method of screwing such small threaded screws is to use a manual screwdriver. This is time consuming. In comparison, applicants' conduit box utilizes a self-tapping screw which can be screwed in with a screw-gun which is much faster than a manual screwdriver. Since the screw is self-tapping and does not require close tolerance threading, the installer is less concerned with stripping the threads on the screw. The applicants' conduit box utilizes a new principle of operation by utilizing self-tapping screws.

| "Lighting Fixture" | 3,036,207 Endelson 5/22/62 |
| --- | --- |

Endelson shows a lighting fixture with arcuate slots that allow limited axial movement with pins restricting the movement. The fastening means is a central stud 20 with a nut 42. (e.g. col. 3, 1. 50–51). The slots (46, 48) and the pins (38, 40) act merely as guides before the nut is tightened and are not as an integral part of the fastening means.

Furthermore, Endelson fixture has four components for its fastening means. First, a threaded stud. Second, a threaded nut. Third, an arcuate slot. Fourth, a pin to fit in the arcuate slot. In contrast, the applicants' conduit box has only two parts for its fastening means. First, a self-tapping screw.

Second, an arcuate slot to receive the self tapping screw. Therefore, the applicants' conduit box reduces the number of components for the fastening means.

The Endelson pins and slots act only as a guide to limit the rotation of the fixture. This is demonstrated by arcuate slot 46 being longer than arcuate slot 48. The different slots are utilized to limit the rotation. In comparison, the applicants' slots are an integral part of the fastening means and do not act only as a guide to limit the rotation of the fixture.

A disadvantage of Endelson is that the when the center nut is tightened, the entire apparatus will tend to rotate clockwise with the tightening of the nut. This is because a center torque will apply a turning force to the entire apparatus when the nut is near the end stages of being tightened. The rotation could go as far as arcuate slots and pins will allow. In comparison, the applicants' conduit box is attached with self-tapping screw near the outer edges of the box. Therefore, the turning force is not applied at the center axis of the device and is less likely to result in the apparatus turning.

Endelson shows a lighting fixture with arcuate slots that allow limited axial rotation with pins restricting the rotation. The fastening means is a central stud 20 with a nut 42. (e.g. col. 3, 1. 50–51). The slots (46, 48) and the pins (38, 40) act merely as guides before the nut is tightened and are not as an integral part of the fastening means 32. The Endelson pins and slots act only as a guide to limit the rotation of the fixture. This is demonstrated by arcuate slot 46 being longer than arcuate slot 48. The different slots are utilized to limit the rotation. In comparison, the applicants' slots are an integral part of the fastening means and do not act only as a guide to limit the rotation of the fixture. Thus applicants' use is a new principle of operation because the arcuate slots are not used as guides and there is no central threaded stud with a nut.

Endelson fixture has four elements for its fastening means: 1) a threaded stud, 2) a threaded nut, 3) an arcuate slot, and 4) a pin to fit in the arcuate slot. In contrast, the applicants' conduit box has only two parts for its fastening means: 1) a self-tapping screw, and 2) an arcuate slot to receive the self tapping screw. Therefore, the applicants' conduit box reduces the number of elements for the fastening means.

| "Recessed Lighting Fixtures" 3,099,404 Kaufman, et al. 7/30/63 |
|---|

Kaufman, et. al. ("Kaufman") shows a recessed lighting fixture having a movable socket carrying plate that vertically adjusts to accommodate different size lamps. The lighting socket is moved and locked into place with spring-loaded tongue that impales the slot as a locking mechanism.

Applicants' improved ring-riser utilizes an arcuate slot to receive a self-tapping fastening means, such as a self-tapping screw. The primarily distinction is that Kaufman allows vertical relocation of the fixture. In comparison, applicants' improved ring riser allows axial rotation of fixtures and devices. Therefore, the difference is that the axis of relocation is different.

Kaufman shows a recessed lighting fixture having a movable socket carrying plate that vertically adjusts to accommodate different size lamps. The lighting socket is moved and locked into place with spring-loaded tongue that impale the slot as a locking mechanism. The primarily function of Kaufman is to allow vertical relocation of the fixture. In comparison, applicants' improved ring-riser allows axial rotation of fixtures and devices. The difference is that the axis of relocation is different.

| "Plate For Adjustably Mounting Electrical Receptacle" | 3,917,899 Oliver 11/4/75 |
|---|---|

Oliver shows a electrical receptacle that is mounted utilizing a "clamping means" (e.g. col. 4, 1. 51–52). The purpose of the clamping means is two fold. First, the clamping means in for the purpose of grounding the outlet. Second, the clamp is allows axial rotation of the electrical receptacle.

Applicants' improved ring riser utilizes an arcuate slot to receive a self-tapping fastening means, such as a self-tapping screw. The clamping means demonstrates that Oliver was substantially concerned with having a positive connection with a large surface area for grounding purposes, thus utilizing a self-tapping screw would be an unobvious substitute. Furthermore, Oliver has no arcuate slot for receiving a self-tapping screw.

Oliver has the problem that to mount the receptacle, the receptacle must be maneuvered to allow the flanges of the clamping means to fit within the interior edge of the opening of the "plate [with] . . . central raised portion" (e.g. col. 4, 1. 53–56) ("ring riser"). In contrast, applicants' improved ring-riser does not require flanges to fit within the interior edge of the ring-riser. Instead, a conventional receptacle would be placed on the exterior of the applicants' ring-riser and mounted utilizing self-tapping screws.

Furthermore, the device for Oliver would be expensive to construct because it requires a specially made electrical receptacle with a "grounding wedge" (e.g. col. 3, 1. 31–32) and other moving parts. Such a specially made electrical receptacle would be expensive to construct compared to a conventional mass produced electrical receptacle. In comparison, applicants' ring-riser utilizes conventional electrical receptacles that are mounted with a self-tapping screw. Thus applicants' ring-riser would utilize readily available electrical receptacles.

Oliver utilizes a threaded screw which penetrates an ear and engages a grounding wedge through a screw threaded hole located on the grounding wedge. The fastening means has three elements: 1) a threaded screw, 2) an ear (screw goes through), and 3) a grounding wedge with a screw threaded hole. In contrast, the applicants' conduit box only utilizes two elements in its fastening means: 1) a self-tapping screw and 2) an arcuate slot. The self-tapping screw engages the arcuate slot to form the fastening means. Thus applicants' conduit box's fastening means omits an element.

Oliver utilizes a threaded screw which penetrates an ear and engages a grounding wedge through a screw threaded hole. Oliver makes no reference to having an arcuate slot to receive a self-tapping screw. In contrast, applicants' conduit box utilizes an arcuate slot to receive a self-tapping screw. Therefore, applicants' conduit box has an unsuggested modification.

| "Self-Aligning Outlet Box Assembly" 4,098,423 Marrero 5/22/90 |
|---|

This patent is a spring loaded box. This box is difficult to construct and requires special parts to use. In contrast, applicants' box is a simpler design. This box adjusts longitudinal and not axially. Applicants' improved conduit box adjusts axially. Furthermore, this box locks in place and cannot be adjusted once locked in place. Whereas, applicants' improved conduit box can be unscrewed and readjusted.

| "Adjustable Electric Outlet Box" | 4,634,015 Taylor 1/6/87 |
|---|---|

This box has a collar in the box interior which allows depth adjustment via a screw. This box does not adjust axially. Applicants' improved conduit box adjusts axially.

| "Dual Size Outlet Box Mounting Bracket" 4,757,908 Medlin, Sr. 7/19/88 |
|---|

Medlin, Sr. ("Medlin") shows a outlet or junction box mounted on a bracket that is mounted to a vertical stud. The bracket allows the mounting of the outlet box. The bracket has multiple openings to receive different screws for different commercially available of boxes. The bracket is for the mounting of the box by connecting to at least one adjoining wall or stud. The purpose of the bracket is to be able to mount different boxes to the universal bracket which is mounted to a wall The purpose of the Medlin mounting bracket is to be able to mount different boxes to the universal bracket which is mounted to a wall. In contrast, the applicants' improved conduit box and improved bracket vary in the basic goal of properly mounting a device on a misaligned conduit box. Therefore, the Medlin bracket and the applicants' bracket are very different.

Medlin has a disadvantage that it does not allow the axial rotation of the device or fixture to be mounted. In comparison, the applicants' improved conduit box and improved bracket permit axial rotation of the device or fixture. Thus applicants' conduit box and bracket are novel.

Furthermore, the Medlin mounting bracket works with the presumption that the box is not yet mounted and utilizes the bracket in the box mounting. In contrast, the applicants' improved conduit box and improved bracket work on the presumption that the box is already mounted misaligned in the wall. The benefits of the applicants' conduit box and bracket are only utilized after the box is mounted misaligned in the wall.

Medlin shows a outlet or junction box mounted on a bracket that is mounted to a vertical stud. The bracket allows the mounting of the outlet box. The bracket has multiple openings to receive different screws for different commercially available of boxes. The bracket is for the mounting of the box by connecting to at least one adjoining wall or stud. The purpose of the bracket is to be able to mount different boxes to the universal bracket which is mounted to a wall. In comparison, the applicants' bracket is to convert a conventional conduit box to the equivalent of an improved conduit box by adding the arcuate slot. Thus a different problem is solved.

The purpose of the Medlin mounting bracket is to be able to mount different boxes to the universal bracket which is mounted to a wall. In contrast, the applicants' improved conduit box and improved bracket vary in the basic goal of properly mounting a device on a misaligned conduit box. Therefore, the Medlin bracket and the applicants' bracket are very different.

The Medlin mounting bracket works with the presumption that the box is not yet mounted and utilizes the bracket in the box mounting. In contrast, the applicants' improved conduit box and improved bracket work on the presumption that the box is already mounted misaligned in the wall. The benefits of the applicants' conduit box and bracket are only utilized after the box is mounted misaligned in the wall. Thus the applicants' improved conduit box and bracket are not truly related to Medlin.

| "Adjustable Mounting Assembly for Electrical Outlet Box" | 5,289,934 Smith et al. 3/1/94 |
|---|---|

This box allows depth adjustment of the box via a screw. This box does not adjust axially. Applicants' improved conduit box adjusts axially.

| "Unterputzdose mit eingesetzter Tragvorrichtung fur mehrere Installationsgerate" | 206963 Germany 1/11/60 |
|---|---|

Germany shows a bracket with an arcuate slot that is connected to a conduit box. The bracket is then used to snap in various electrical switches. Tongue 2a appears to snap into open flange 1c.

Furthermore, the arcuate slot is utilized as a guide and not as an integral part of the fastening means for the electrical device that the applicants' bracket utilizes. In contrast, applicants' bracket utilizes a self-tapping screw to attach the electrical device.

Furthermore, in Silverman FIG. 3, the screw receiving hole 6d has an apparent second horizontal line indicating that it has threading for a threaded screw. Therefore, Germany utilizes a threaded screw as a fastening means. Applicants utilize a self-tapping fastening means.

In conclusion, the applicants' bracket differs from Germany for two reasons. First, Germany's bracket adjusts within the box to form the proper alignment and the switches are aligned with the bracket. In comparison, the applicants' bracket is aligned with the misaligned box and the electrical device is then properly aligned utilizing self-tapping screws that connect to the arcuate slots in the bracket. In essence, the applicants' bracket transforms a conventional conduit box into an improved conduit box (See applicants' FIG. 6). Second, Germany utilizes a tongue and flange system of connecting the switch to the bracket. In contrast, the applicants' utilize a self-tapping screw fastening means to connect the electrical device to the bracket.

Germany utilizes a threaded screw which penetrates an arcuate slot and is received by a screw threaded hole. These patents utilize three elements for its fastening means: 1) threaded screw, 2) arcuate slot, and 3) screw threaded socket. The threaded screw penetrates the arcuate slot and threads into the screw threaded socket. The fastening occurs through a clamping means gripping the arcuate slot between the threaded screw and the screw threaded socket. In comparison, applicants' self-tapping fastening means only has two elements: 1) self-tapping screw and 2) arcuate slot. The self-tapping screw engages with the arcuate slot to form the fastening means. Thus applicants' conduit box's fastening means omits an element.

Germany utilizes a threaded screw which penetrates an arcuate slot and is received by a screw threaded hole. Applicants' conduit box fastening means utilizes a self-tapping screw which does not require a screw threaded hole. Thus the applicants' have made an unsuggested modification.

Germany utilizes a threaded screw which penetrates an arcuate slot and is received by a screw threaded hole.

Threaded screws must be carefully screwed in to prevent the screw threading from being "stripped." The preferred method of screwing such small threaded screws is to use a manual screwdriver. This is time consuming. In comparison, applicants' conduit box utilizes a self-tapping screw which can be screwed in with a screw-gun which is much faster than a manual screwdriver. Since the screw is self-tapping and does not require close tolerance threading, the installer is less concerned with stripping the threads on the screw. The applicants' conduit box utilizes a new principle of operation by utilizing self-tapping screws.

OBJECTS AND ADVANTAGES

Accordingly, several objects and advantages of applicants' improved conduit box are:

1. Provides axially correctable orientation of devices or fixtures when the box is mounted non-vertical. The correction involves mounting the fixture vertically to the box. The conduit box does not need to be mounted vertically. The cover plate will mount on to the device or fixture and follow the same orientation as the fixture. No other adjustments are necessary.
2. The device or fixture can be removed by unscrewing the said device or fixture. The said device or fixture can be readjusted if necessary.
3. Provides a very simple construction which does not require multiple specially made parts for mounting the device or fixture. Does not have any moving parts.
4. Long screws or other fastening means can be used to adjust the depth of the device or fixture if the box is mounted deeper in the wall, floor, ceiling than normal.
5. Self-tapping screws do not require carefully threading the screw into the threaded nut like a threaded screw. Thus allowing electricians to save time by using a screw gun instead of a conventional screwdriver.
6. Self-tapping screws eliminate the requirement of having a threaded receptacle such as a threaded nut to receive a threaded screw because the arcuate slot functions as an integral part of the fastening means.
7. Further objects and advantages of our invention win become apparent from a consideration of the drawings and ensuing description.

DRAWING FIGURES

FIG. 1 shows the improved ring-riser without any fixtures attached.

FIG. 2 shows the front view of the ring-riser with an electrical switch device and cover plate mounted.

FIG. 3 shows the front view of the conduit box with an electrical receptacle device and cover plate mounted.

FIG. 4 conduit box.

FIG. 5 shows a bracket with a plurality of devices and cover plate mounted in the improved large conduit box.

FIG. 6 shows a bracket that can be mounted on a conventional conduit box.

LIST OF REFERENCE NUMERALS

70. Bracket with slots
80. Ring-riser
90. Bracket for a plurality of devices
100. Conduit box
110. Hole in bracket
120. Slot to receive self-tapping screw
130. Self-tapping screw for bracket
135. Threaded screw for bracket
140. Conventional knock-out holes
150. Hole in bracket for receiving screws from devices
160. Self-Tapping Screw for device
170. Conventional threaded screw for device
180. Conventional electric switch device
190. Conventional electric receptacle device
200. Conventional threaded screw for cover plate
220. Conventional cover plate
240. Conventional conduit box

SUMMARY

One embodiment of applicant's improved ring-riser would connect to a conventional conduit box. The ring-riser has arcuate slots that are dimensioned to be the arc of a circle about the front of the ring-riser. The slots allow axial adjustment of the device or fixture to be mounted to the ring-riser and conduit box assembly with self-tapping screws or other fastening means. The slots are an integral part of the self-tapping screw fastening means. Self-tapping screws appear to be the best mode of self-tapping fastening means. Long screws can be used for depth adjustment in the event that the box assembly is mounted extremely misaligned.

Another embodiment of applicants' improvement would be a conduit box with two slots capable of receiving self-tapping screws or other self-tapping fastening means to secure a device or fixture to the box.

Another embodiment of applicants' improvement would be a ring-riser with two slots capable of receiving self-tapping screws or other self-tapping fastening means to secure a device or fixture to a junction box.

Another embodiment of applicants' improvement would be a bracket with two slots capable of receiving self-tapping screws or other self-tapping fastening means to secure a device or fixture to a junction box.

However, the embodiments of applicants' improvement to the ring-riser and conduit box can be adjusted by one skilled in the art.

DESCRIPTION

FIG. 1—Ring-Riser

FIG. 1 consists of a ring-riser 80 with a slot 120 on the top and bottom of the ring-riser 80 to receive a self-tapping screw (not shown) for a conventional device or fixture (not shown).

OPERATION

FIG. 1—Ring-Riser

The ring-riser 80 mounts onto a conventional conduit box. The slot 120 will receive a self-tapping screw for mounting a device or fixture. The slot 120 is a dimensioned to be an arc of a circle about the facial center axis of the ring-riser 80. The slot 120 functions as an integral part of the fastening means without a receptive threading for the screw. A device or fixture can be rotated around its central axis to be mounted vertically while the ring-riser 80 is slanted.

DESCRIPTION

FIG. 2—Conduit Box with Switch Device and Cover Plate

FIG. 2 consists of a ring-riser 80 with a slot 120 on the top and bottom of the ring-riser 80 to receive a self-tapping screw 160. The slot 120 receives the screw 160. The screw 160 attaches a conventional switch device 180 to the ring-rise 80. The switch device 180 can be adjusted axially, then secured in place with the screw 160 through the slot 120 to the ring-riser 80. A screw 200 fastens a cover plate 220 to the device 180 through threaded screw holes in the device 180.

OPERATION

FIG. 2—Ring-Riser with Switch Device and Cover Plate

The ring-riser 80 can be mounted on a conventional conduit box (not shown) slanted in a wall, ceiling, or floor. The arc slots 120 allow for rotation of the device 180 to be vertical without moving the ring-riser 80. The self-tapping screw 160 fastens the device 180 to the ring-riser 80. The cover plate 220 is then mounted on the device 180 with the screws 200. The cover plate 220 is automatically aligned with the device 180.

DESCRIPTION

FIG. 3—Conduit Box with Electrical Receptacle Device and Cover Plate

FIG. 3 consists of a conduit box 100 with a slot 120 on the top and bottom of the box 100 to receive a self-tapping screw 160. The slot 120 receives the screw 160. The screw 160 attaches a conventional electrical receptacle device 190 to the conduit box 100. The receptacle device 190 can be adjusted axial, then secured in place with the screw 160 through the slot 120 to the box 100. A screw 200 fastens a cover plate 220 to the electrical receptacle device 190 through threaded screw holes in the device 190.

OPERATION

FIG. 3—Conduit Box with Electrical Receptacle Device and Cover Plate

The box 100 can be mounted slanted in a wall, ceiling, or floor. The arc slots 120 allow for rotation of the device 190 to be vertical without moving the box 100. The cover plate 220 is then mounted on the device 190. The cover plate 220 is automatically aligned with the device 190.

DESCRIPTION

FIG. 4—Conduit Box

FIG. 4 consists of a conduit box 100 with a slot 120 on the top and bottom of the box 100 to receive a self-tapping screw for a device or fixture. The box 100 can have a conventional knock-out hole 140 on the sides to provide openings for wires, conduit and similar applications.

OPERATION

FIG. 4—Conduit Box

The slot 120 will receive a self-tapping screw for mounting a device or fixture. The slot 120 is a dimensioned to be an arc of a circle about the facial center axis of the box 100. A device or fixture can be rotated around its central axis to be mounted vertically while the box 100 is slanted.

DESCRIPTION

FIG. 5—Bracket with a Plurality of Devices and Cover Plate

FIG. 5 consists of a bracket 90 secured to a box 100 by a hole 110 in the bracket 90 to a slot 120 in the box 100. The bracket 90 can be adjusted axially, then secured in place with a screw 130 through the hole 110 to the box 100. The screw 130 secures the bracket 90 to the box 100. A hole 150 receives a screw 170. The screw 170 attaches a conventional electrical switch device 180 and a conventional electrical receptacle device 190 to the bracket 90. A screw 200 fastens a cover plate 220 to the devices 180 and 190 through the threaded screw holes in the devices 180 and 190.

OPERATION

FIG. 5—Bracket with a Plurality of Devices and Cover Plate

The bracket 90 is mounted to the conduit box 100. The screw 130 connects the bracket 90 through the hole 110 in the bracket 90 through the arc slot 120 in the box 100. The arc slot 120 allow for rotation of the bracket 90 to be vertical without moving the box 100. The plurality of devices 180 and 190 are mounted to the bracket 90 through the hole 150 with the screw 170. The cover plate 220 is mounted on the devices 180 and 190. The cover plate 220 is mounted to devices 180 and 190 by the screw 200 and the cover plate 220 is automatically aligned.

DESCRIPTION

FIG. 6—Bracket that can be Mounted on a Conventional Conduit Box

FIG. 6 consists of a bracket 70 with a arc slot 120. A screw 135 connects the bracket 70 through the slot 120 to a conventional conduit box 240.

OPERATION

FIG. 6—Bracket that can be Mounted on a Conventional Conduit Box

The conventional conduit box 240 is mounted slanted in a wall. The bracket 70 mounts to the box 240 by the screw 135 through the slot 120 in the bracket 70. The slot 120 in the bracket 70 is used to mount devices or fixtures vertically.

DETAILED DESCRIPTION

Applicants' improvement to ring-risers and conduit boxes have several embodiments. One of the embodiments of applicants' improvement is a ring-riser with slots capable of receive screws or other fastening means. The ring riser is connected to a conventional conduit box. The slots on the ring-riser will allow axial adjustment of the device or fixture to be mounted to the ring-riser. The ring-risers are often used with conduit boxes in concrete walls and drywall sheet-rock walls.

Another embodiment of applicants' improvement is a conduit box with slots capable of receiving a self-tapping screw or other self-tapping fastening means. The slots on the conduit box allow axial adjustment of the device or fixture to be mounted to the conduit box.

Furthermore, applicants' improved conduit box is an improvement over the prior art because it eliminates the element of having a threaded receptacle opening by utilizing a self-tapping screw.

Another embodiment includes ring-risers and conduit boxes that may receive a plurality of devices or fixtures with the use of a bracket.

Another embodiment is a bracket with arcuate slots capable receiving a self-tapping fastening means from the devices or fixtures. The bracket is to be mounted on a conventional ring-riser or conventional conduit box.

However, the embodiments of applicants' improvement to the ring-riser and conduit box can be adjusted by one skilled in the art.

Further objects and advantages of applicants' invention will become apparent from a consideration of the drawings and ensuing description.

CONCLUSIONS, RAMIFICATIONS AND SCOPE

The Improved Conduit Box makes it easier to mount a box and make the outlet or switch align vertically.

The box is can be mounted slightly crooked and not have to be removed and reinstalled to have a properly aligned electrical receptacle, switch, etc.

Applicants' improved conduit box could save time on construction projects because it would be quicker to mount this box and make the final alignments than to have to dismount and remount the box to make alignment adjustments.

Furthermore, applicants' improved conduit box utilizes self-tapping screws, thus, the electricians do not need to align the threads that the conventional boxes utilize. In addition, the electricians do can use screw guns instead of conventional screw drivers to save time because there is no threads to align.

We claim:

1. A device for mounting an electrical device or fixture to an electrical box, comprising:
   a. a ring riser having a mounting face and an arcuate slot located in said mounting face of said ring riser, and
   b. a threaded self tapping fastening means for mounting an electrical device or fixture to said ring riser, wherein the threads of said self tapping fastening means engage said slot, whereby the electrical device or fixture can be rotated axially before said self tapping fastening means is engaged.

2. The device of claim 1 wherein said fastening means is comprised of self tapping screws, nails, or other self tapping fasteners to secure said electrical device or fixture to the said ring riser.

3. The device of claim 2 wherein said fastening means is self tapping screws.

4. The device of claim 1, further including a bracket to mount a plurality of electrical devices or fixtures to the said ring riser.

5. A conduit box comprising:
   a. a box having a mounting face and an arcuate slot located on said mounting face of said box, and
   b. a threaded self tapping fastening means to mount an electrical device or fixture to said box, wherein the threads of said self tapping fastening means engage said slot, whereby the electrical device or fixture can be rotated axially before said self tapping fastening means is engaged.

6. The conduit box of claim 5 wherein said fastening means is comprised of self tapping screws, nails, or other self tapping fasteners to secure said electrical device or fixture to the said box.

7. The conduit box of claim 6 wherein said fastening means is self tapping screws.

8. The conduit box of claim 5, further including a bracket to mount a plurality of fixtures and or devices to said box.

9. A bracket for mounting an electrical device or fixture to a conduit box or ring riser, comprising:
   a. a body of material having a substantially flat surface and an arcuate slot located in said body, and
   b. a threaded self tapping fastening means to mount an electrical device or fixture to said body, wherein the threads of said self tapping fastening means engages said slot, whereby the electrical device or fixture can be rotated axially before said self tapping fastening means is engaged.

10. The bracket of claim 9 wherein said fastening means is comprised of screws, nails, or other self tapping fasteners to secure said electrical device or fixture to the said flat body.

11. The bracket of claim 10 wherein said fastening means is self tapping screws.

12. The bracket of claim 9, wherein said bracket is adaptable to mount a plurality of fixtures and or devices to said body.

* * * * *